United States Patent [19]

Tanaka et al.

[11] 4,385,395
[45] May 24, 1983

[54] BIT CLOCK REPRODUCING CIRCUIT

[75] Inventors: Masato Tanaka; Nobuhiko Watanabe, both of Tokyo, Japan

[73] Assignee: Sony Corporation, Tokyo, Japan

[21] Appl. No.: 254,290

[22] Filed: Apr. 15, 1981

[30] Foreign Application Priority Data

Apr. 22, 1980 [JP] Japan .................................. 55-53252

[51] Int. Cl.³ ............................................. H03L 7/06
[52] U.S. Cl. .................................. 375/110; 375/119; 307/528; 328/63
[58] Field of Search ................. 370/100; 375/106, 110, 375/118, 119; 307/511, 518, 526, 527, 528; 328/63; 360/51; 340/825.14

[56] References Cited

U.S. PATENT DOCUMENTS

| | | | |
|---|---|---|---|
| 3,813,604 | 5/1974 | Denoncourt | 307/527 |
| 3,845,399 | 10/1974 | Cardon et al. | 307/528 |
| 4,004,090 | 1/1977 | Goto | 375/119 |
| 4,191,976 | 3/1980 | Braun | 360/51 |
| 4,218,770 | 8/1980 | Weller | 375/110 |
| 4,222,009 | 9/1980 | Moulton | 375/110 |
| 4,227,251 | 10/1980 | Kazama et al. | 375/110 |
| 4,280,099 | 7/1981 | Rattlingound | 375/119 |
| 4,309,662 | 1/1982 | Baudoux | 307/528 |

*Primary Examiner*—Benedict V. Safourek
*Attorney, Agent, or Firm*—Hill, Van Santen, Steadman, Chiara & Simpson

[57] ABSTRACT

A bit clock reproducing circuit produces an output bit clock signal in response to an input clock signal but without reproducing jitter present in the input signal. A counter is supplied with a reference clock signal as a counting input, and the counter is periodically loaded, at a fixed time during each cycle of the input clock signal, with data which is a predetermined function of the state of the counter at such times.

4 Claims, 6 Drawing Figures

FIG. 2A

| $A_0 \sim A_3$ | $D_0 \sim D_3$ | PHASE SHIFT |
|---|---|---|
| 0 | 1 | 0 |
| 1 | 2 | 0 |
| 2 | 3 | 0 |
| 3 | 3 | −1 |
| 4 | 3 | −2 |
| 5 | 3 | −3 |
| 6 | 3 | −4 |
| 7 | 3 | −5 |
| 8 | 15 | +6 |
| 9 | 15 | +5 |
| 10 | 15 | +4 |
| 11 | 15 | +3 |
| 12 | 15 | +2 |
| 13 | 15 | +1 |
| 14 | 15 | 0 |
| 15 | 0 | 0 |

FIG. 2B

| $A_0 \sim A_3$ | $D_0 \sim D_3$ | PHASE SHIFT |
|---|---|---|
| 0 | 1 | 0 |
| 1 | 1 | −1 |
| 2 | 2 | −1 |
| 3 | 3 | −1 |
| 4 | 4 | −1 |
| 5 | 5 | −1 |
| 6 | 6 | −1 |
| 7 | 7 | −1 |
| 8 | 10 | +1 |
| 9 | 11 | +1 |
| 10 | 12 | +1 |
| 11 | 13 | +1 |
| 12 | 14 | +1 |
| 13 | 15 | +1 |
| 14 | 0 | +1 |
| 15 | 1 | +1 |

FIG. 2C

| $A_0 \sim A_3$ | $D_0 \sim D_3$ | PHASE SHIFT |
|---|---|---|
| 0 | 1 | 0 |
| 1 | 2 | 0 |
| 2 | 3 | 0 |
| 3 | 3 | −1 |
| 4 | 3 | −2 |
| 5 | 3 | −3 |
| 6 | 3 | −4 |
| 7 | 3 | −5 |
| 8 | 11 | +2 |
| 9 | 12 | +2 |
| 10 | 13 | +2 |
| 11 | 14 | +2 |
| 12 | 15 | +2 |
| 13 | 15 | +1 |
| 14 | 15 | 0 |
| 15 | 0 | 0 |

BIT CLOCK REPRODUCING CIRCUIT

BACKGROUND OF THE INVENTION

1. Field of the Invention

The present invention relates generally to a bit clock signal reproducing circuit, and is directed more particularly to a digital bit clock signal reproducing circuit which can stably reproduce a bit clock.

2. Description of the Prior Art

Upon recording or transmitting digital data, if a self-clock modulation system such as PM (pulse modulation), MFM (modified frequency modulation), M$^2$FM (modified double frequency modulation) or the like is employed, it is necessary that at a reproducing or receiving site that a bit clock be reproduced at the transition point between 0→1 or 1→0 in a data stream and data is obtained based upon the reproduced bit clock signal.

In the art, a bit clock signal reproducing circuit of analog PLL (phase locked loop) form and of digital PLL form have been used as the above bit clock reproducing circuits.

According to the prior art in bit clock reproducing circuits of the analog PLL type, a bit clock is produced by a voltage controlled oscillator, and the data edge and the bit clock signal are phase-compared with a phase comparator and the compared output voltage is fed through a low pass filter to the oscillator to phase-correct the bit clock output.

According to the prior art bit clock reproducing circuit of the digital PLL form, a master clock with a high frequency is applied to the clock terminal of a counter, and it is then frequency-divided to produce a bit clock signal, and a data edge detecting pulse is applied to the load terminal of the counter to load the counter to a constant value at the data edge, so as to phase correct the bit clock signal.

However, in analog PLL type bit clock reproducing circuits, the free running frequency of the voltage controlled oscillator is astable due to variations of temperature and humidity and hence the phase locked state of the PLL is apt to be released. Also, when reproduction is carried out while the speed thereof is varied, it is necessary that the free running frequency of the voltage controlled oscillator be accurately tracked to the varying speed. However, in practice, this is presently impossible.

The digital PLL type bit clock reproducing circuit is stable for variations of temperature and humidity and other variations. Also, when reproduction is carried out while the speed is varied, the frequency of the master clock can be varied in response to the speed variation, which can be easily accomplished.

According to the analog PLL type bit clock reproducing circuit, the phase of the bit clock depends on the average phase of the data edges, while according to the digital PLL type bit clock reproducing circuit, the phase of the bit clock depends on the instant phase of the data edge. Accordingly, in the digital bit clock reproducing circuit, if fine jitter exists in the data edge due to a peak shift or the like, jitter will be generated in the bit clock signal which has an extremely short or long period.

SUMMARY OF THE INVENTION

Accordingly, an object of the present invention is to provide a novel bit clock reproducing circuit with a bit clock reproducing circuit of a digital PLL form which is free from the defects inherent in the prior art.

Another object of the invention is to provide a bit clock reproducing circuit which can stably reproduce a bit clock.

A further object of the invention is to provide a bit clock reproducing circuit in which the response characteristic of a bit clock to the jitter of data edges can be easily determined.

A further object of the invention is to provide a bit clock reproducing circuit which avoids the generation of jitter in a bit clock caused by fine jitter such as peak shift of a data edge or the like.

A yet further object of the invention is to provide a bit clock reproducing circuit which has a response characteristic similar to that of the bit clock reproducing circuit of an analog PLL structure.

A still further object of the invention is to provide a bit clock reproducing circuit which can avoid the generation of a bit clock with extremely short or long periods.

According to an aspect of the present invention, there is provided a bit clock reproducing circuit which comprises:

(a) a first input terminal for receiving input data;
(b) a second input terminal for receiving a reference clock signal;
(c) a first circuit means provided with said input data and said reference clock signal and for producing a control signal corresponding to the edge of said input data;
(d) counter means provided with said reference clock signal, said control signal and the initial data in response to the control signal for producing counting output signals;
(e) second circuit means receiving said counting outputs for generating output data corresponding to said counting outputs, and said output data being provided to said counter means as the initial data; and
(f) an output terminal for deriving a bit clock corresponding to said counting outputs.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 2A is a table showing the memory content of a read-only memory used in the bit clock reproducing circuit shown in FIG. 1 and the phase shift amount caused thereby;

FIGS. 2B and 2C show other examples of the memory content of the read-only memory and the amount of phase shift;

DESCRIPTION OF THE PREFERRED EMBODIMENTS

The present invention will be hereinafter described with reference to the attached drawings.

Figure 1:
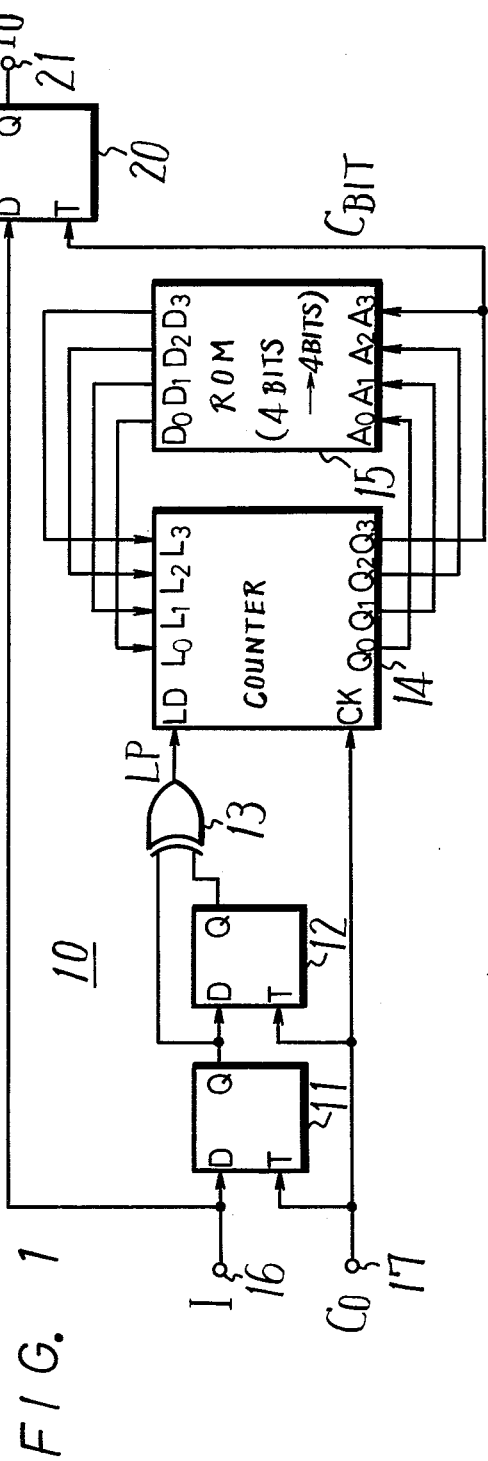
FIG. 1 is a block diagram showing an example of the bit clock reproducing circuit according to the present invention.

FIG. 1 illustrates an example of the bit clock reproducing circuit according to the invention. The bit clock reproducing circuit, generally designated as 10 in FIG. 1, is composed of 2 D-type flip-flops 11 and 12, an exclusive OR gate 13, a counter 14 and a ROM (read-only memory) 15 connected as shown. Input data I is supplied through an input terminal 16 to the D-input terminal of the D-type flip-flop 11, and a master clock i.e. clock signal $C_0$ of high frequency is supplied through an input terminal 17 to a T-input terminal of the D-type flip-flop 11. The output at a Q-output terminal of the D-type flip-flop 11 is supplied to a D-input terminal of the D-type flip-flop 12 and the clock signal $C_0$ is supplied to a T-input terminal of the D-type flip-flop 12. The exclusive OR gate 13 is supplied with the outputs from the Q-output terminals of the D-type flip-flops 11 and 12 and produces a detecting pulse LP for detecting the edges of data.

The counter 14 is of a load type, and is supplied at its load terminal LD with the data edge detecting pulse LP from the gate 13 as a load pulse signal and receives at its clock terminal CK the clock signal $C_0$. In this example, the frequency of the clock signal $C_0$ is selected to be 16 times that of a bit clock which is to be provided, so that the counter 14 is of the 4 bits and hexadecimal type. In the counter 14, numerical values are applied to its load input terminals $L_0$, $L_1$, $L_2$ and $L_3$ and are, respectively, loaded to its output terminals $Q_0$, $Q_1$, $Q_2$ and $Q_3$ on the negative edge of the load pulse LP.

The ROM 15 corresponds to the counter 14, and both the ROM 15 and the counter 14 utilize 16 words of 4 bits each. The outputs $Q_0$ to $Q_3$ of the counter 14 are applied to the address input terminals $A_0$, $A_1$, $A_2$ and $A_3$ of the ROM 15 and the numerical values corresponding thereto are respectively read out and delivered to output terminals $D_0$, $D_1$, $D_2$ and $D_3$ of the ROM 15. The read out numerical values are fed to the load input terminals $L_0$ to $L_3$ of the counter 14. Thus, the counter 14 is loaded at every negative edge of the data edge detecting pulse LP with such numerical values in response to the state of the outputs $Q_0$ to $Q_3$ just before the occurence of the negative edge of the data edge detecting pulse LP.

The relationship of the numerical values obtained at the output terminals $D_0$ to $D_3$ of the ROM 15 correspond with those at the address input terminals $A_0$ to $A_3$ and are by way of example, shown in the table of FIG. 2A.

The most significant bit in the outputs appearing at the terminal $Q_3$ of the counter 14 is derived as an output bit clock $C_{BIT}$.

In this case, the D-type flip-flops 11, 12 and counter 14 each operate at, for example, the positive edge of the clock signal $C_0$.

In FIG. 1, 20 designates a D-type flip-flop which is provided to extract data and receives at its D-input terminal the input data I which is the same as that applied to the D-type flip-flop 11 and receives at its T-input terminal the clock bit $C_{BIT}$. The input data I is extracted at, for example, the positive edge of the clock bit $C_{BIT}$ and is delivered through a Q-output terminal of the D-type flip-flop 20 to an output terminal 21 as the binary value data $I_0$.

Figure 3:
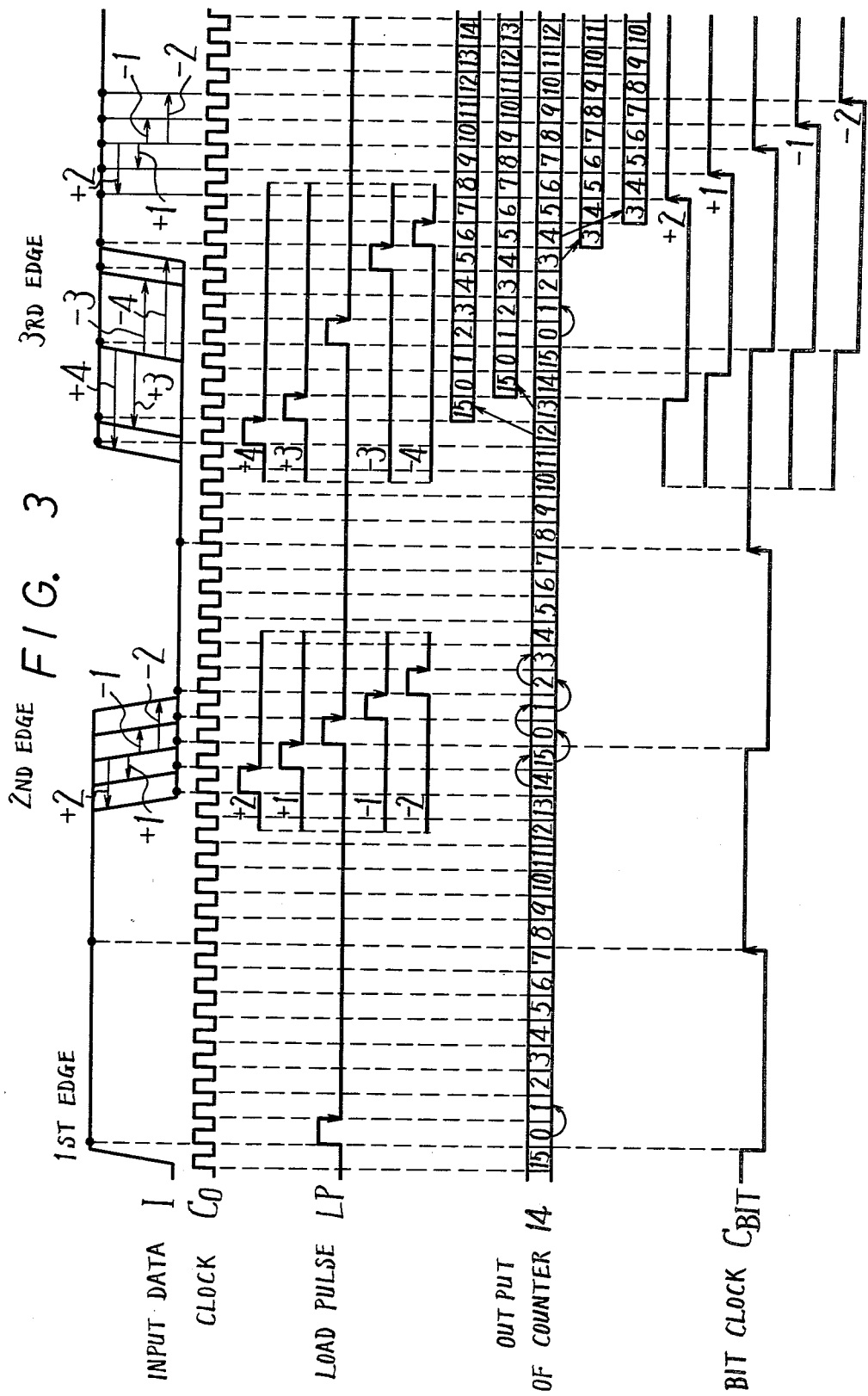
FIG. 3 is a waveform diagram used to explain the operation of the bit clock reproducing circuit shown in FIG. 1.

The operation of the bit clock reproducing circuit 10 of the invention shown in FIG. 1 is as shown in FIG. 3. That is, the exclusive OR gate 13 generates, based upon the input data I and the clock signal $C_0$ applied thereto, the data edge detecting pulse LP which rises at the positive edge of the clock signal $C_0$ and is generated immediately after the edge of the input data I and falls down at the positive edge of the following clock signal $C_0$. At every falling edge i.e. negative edge of the data edge detecting pulse LP, the contents of the ROM 15 according to the state of the outputs at terminals $Q_0$ to $Q_3$ of the counter 14 immediately before the negative edge of the pulse LP will be loaded into the counter 14. After the loading of the contents into the counter 14, the counter 14 counts up one step for each step on every positive edge of the clock signal $C_0$. At the time when the value of the counter 14 becomes 8, which means that 1 appears at its output terminal $Q_3$, the output bit clock $C_{BIT}$ signal rises up, and at the time when the value of the counter 14 becomes 0, which means that the value at the output terminal $Q_3$ has again returned to 0, the output bit clock $C_{BIT}$ will fall down.

As shown by the first data edge in FIG. 3, if the counter 14 is 0 immediately before the negative edge of the data edge detecting pulse LP, the value 1 at the output terminals $D_0$ to $D_3$ of the ROM 15 which corresponds to the case where the values at the input terminals $A_0$ to $A_3$ of the ROM 15 are 0 will be loaded into the counter 14. In other words, in this case the counter 14 changes in the sequence similar to the case where no value is loaded into it.

If the phase of the second data edge is not shifted as shown at the central position in FIG. 3, the data edge detecting pulse LP reaches a position shown in the third row in FIG. 3, and at the negative edge of the pulse LP the counter 14 will be loaded from 0 to 1 similar to the above example.

When the phase of the second data edge is shifted in the direction and advanced by one period of the clock $C_0$ as shown by +1 in FIG. 3, the data edge detecting pulse LP will also be shifted as shown in the second row in FIG. 3. Thus, at the negative edge of the pulse LP the counter 14 is loaded from 15 to 0 as in the example where the inputs $A_0$ to $A_3$ are 15 as shown in FIG. 2A. When the phase of the second data edge is shifted in the direction and advanced by two periods of the clock signal $C_0$ as shown by +2 in FIG. 3, the data edge detecting pulse LP is also shifted as shown in the first row in FIG. 3. Thus, at the negative edge of the pulse LP the counter 14 is loaded from 13 to 15 as shown in the second row in the figure and as in the example where the inputs $A_0$ to $A_3$ are 13 in FIG. 2A, and the phase of the bit clock $C_{BIT}$ is shifted in the direction to advance it by one period of the clock signal $C_0$ as shown in the second row in the Figure. When the phase of the third data edge is shifted in the direction to advance it by four periods of the clock signal $C_0$ shown by +4 in FIG. 3, the data edge detecting pulse LP is shifted as shown in the first row in the Figure. Thus, at the negative edge of the pulse LP the counter 14 is loaded from 12 to 15 as shown in the first row and as in the example where the inputs $A_0$ to $A_3$ are 3 in FIG. 2A, and the phase of the bit clock $C_{BIT}$ is shifted in the direction to advance it by two periods of the clock signal $C_0$ as shown in the first row in the Figure.

When the phase of the third data edge is shifted in the direction to delay it by three or four periods of the clock signal $C_0$ as shown by $-3$ or $-4$ in FIG. 3, due to the operation which is similar to the example where the phase advances as described above, the phase of the bit clock $C_{BIT}$ will be shifted in the direction to delay it by one or two periods of the clock signal $C_0$ as shown in the fourth or fifth row in the Figure.

That is, when the phase shift of the data edge is more than ±3, the phase of the bit clock $C_{BIT}$ will be shifted in the direction the same as that of the phase shift of the data edge which is less than it by 2.

Figure 4:
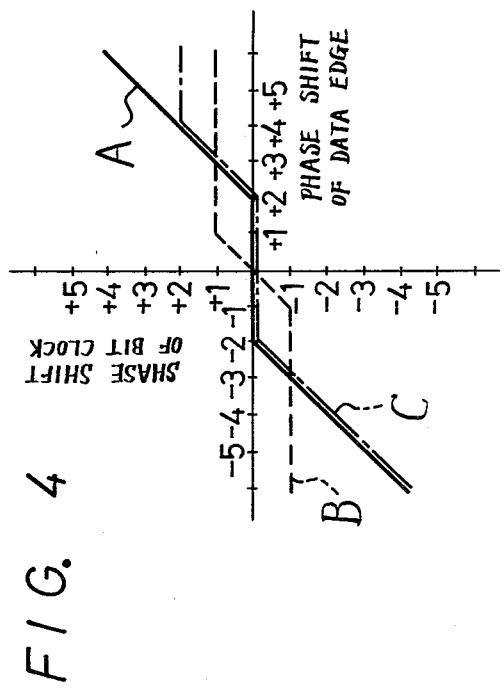
FIG. 4 is a graph showing the response characteristic of the circuit shown in FIG. 1 in which read-only mem-

In the above manner, the memory contents as shown in FIG. 2A give the relationship between the phase shift of the data edge and that of the bit clock signal which is indicated by a solid line A in the graph of FIG. 4 and the back-lash of ±2 occurs as shown.

It is not necessary that the relationship between the state of the outputs $Q_0$ to $Q_3$ of the counter 14, which are fed to the address input terminals $A_0$ to $A_3$ of the ROM 15, and the numerical values which are read out at the output terminals $D_0$ to $D_3$ of the ROM 15 and which are applied to the load input terminals $L_0$ to $L_3$ of the counter 14 be limited to those shown in FIG. 2A, but the relationships shown in FIGS. 2B and 2C can be used. In FIG. 2B, the relationship between the phase shift of the edge of the data and the bit clock signal is as indicated by broken line B in FIG. 4, while in the case of FIG. 2C, the same relationship is as indicated by the one-dot chain line C in FIG. 4.

According to the invention, it is possible to use in place of the load type counter 14 a plurality of flip-flops of, for example, 4 bits for the above example. In this case, when the data edge is detected, the numerical value corresponding thereto is read out from the ROM 15 with the output from the flip-flops of 4 bits and the read out value is returned to the flip-flops of 4 bits.

In the example of the invention shown in FIG. 1 and in the above modified example, a logic circuit composed of combined gates, may be used in place of the ROM 15.

As described above, according to the present invention a certain constant numerical value is not unconditionally loaded into the counter at the edge of the data as in the prior art, but the numerical value determined by the state of the output from the counter at that time is loaded into the counter. Therefore, according to the invention, the response characteristic of the bit clock to the jitter of the data edge can be easily determined, and a back lash, for example, appears in the characteristic so as to avoid the generation of jitter in the bit clock signals which are caused by fine jitter due to the peak shift of the data edge etc., and a fly-wheel effect occurs so as to obtain a response characteristic similar to that of the analog PLL type circuit bit clock reproducing circuit, and the generation of clock bits with extremely short or long periods can be avoided.

It will be apparent that many modifications and variations could be effected by one skilled in the art without departing from the spirits or scope of the novel concepts of the present invention so that the spirits or scope of the invention should be determined by the appended claims.

We claim as our invention:

1. A bit clock reproducing circuit comprising:
   (a) a first input terminal for receiving input data;
   (b) a second input terminal for receiving a reference clock signal;
   (c) first circuit means connected with said first and second terminals and responsive to said input data and said reference clock signal for producing a control signal corresponding to the edge of said input data;
   (d) counter means connected to said first circuit means and responsive to said control signal for receiving initial data, said counter means being connected to said second input terminal and responsive to said reference clock signal for producing a counting output signal;
   (e) second circuit means connected to said counter means and responsive to said counting output signal for generating an output data signal which is a predetermined function of said output counting signal, said output data signal being provided to said counter means as said initial data; and
   (f) an output terminal for manifesting a bit clock signal corresponding to said counting output signal.

2. A bit clock reproducing circuit as claimed in claim 1, wherein said second circuit means is formed of a read only memory having address inputs of plural bits and memory outputs of plural bits, the counting output signals of said counter means being supplied to said address inputs of said read only memory, and the memory data corresponding thereto supplied to said counter means as initial values.

3. A bit clock signal reproducing circuit comprising, a first flip-flop, a second flip-flop connected to the output of said first flip-flop, an OR gate connected to the outputs of said first and second flip-flops, a counter connected to the output of said OR gate and producing a plurality of outputs, a ROM receiving said plurality of outputs of said counter and producing a plurality of outputs which are supplied to said counter, an input clock pulse source terminal connected to said first and second flip-flops and to said counter, a third flip-flop receiving, as an input, a signal from said counter, an input data terminal supplying inputs to said first and third flip-flops, and an output terminal connected to the output of said third flip-flop to produce said clock bit signal corresponding to the plurality of outputs of said counter.

4. A bit clock signal reproducing circuit means according to claim 3 wherein said ROM has address inputs of plural bits and memory outputs of plural bits with the plurality outputs of said counter supplied to the address inputs of said ROM and said memory outputs of said ROM being supplied to said counter.

* * * * *